United States Patent
Yngvesson et al.

(10) Patent No.: US 6,612,001 B1
(45) Date of Patent: Sep. 2, 2003

(54) COUPLING DEVICE

(76) Inventors: Stig-Rune Yngvesson, P.O. Box 64, Fotö S-430 92 (SE); Jan Montin, Gustavsgatan 14, Göteborg S-416 69 (SE)

(*) Notice: Subject to any disclaimer, the term of this patent is extended or adjusted under 35 U.S.C. 154(b) by 0 days.

(21) Appl. No.: 10/030,820

(22) PCT Filed: Jul. 11, 2000

(86) PCT No.: PCT/SE00/01473
§ 371 (c)(1),
(2), (4) Date: Jan. 11, 2002

(87) PCT Pub. No.: WO01/04511
PCT Pub. Date: Jan. 18, 2001

(30) Foreign Application Priority Data

Jul. 12, 1999 (SE) .............................. 9902660

(51) Int. Cl.[7] .............................. F16S 13/16
(52) U.S. Cl. .............................. 24/570; 59/93; 24/692.2; 24/116 R; 24/299
(58) Field of Search .............................. 24/299, 369, 370, 24/570, 577.1, 698.1, 698.2, 116 R, 588.11, 588.112, 593.1, 592.11, 592.1, 591.1; 59/80, 85, 90, 93, 95

(56) References Cited

U.S. PATENT DOCUMENTS

| | | | | |
|---|---|---|---|---|
| 499,225 A | * | 6/1893 | Hayes .............................. 24/698.1 X |
| 534,165 A | * | 2/1895 | Lee .............................. 59/95 X |
| 1,227,171 A | * | 5/1917 | Moore .............................. 24/369 |
| 1,401,503 A | * | 12/1921 | Smith .............................. 24/116 R |
| 1,497,707 A | * | 6/1924 | Young .............................. 24/116 R |
| 1,671,581 A | * | 5/1928 | Greive .............................. 24/582.11 |
| 1,679,416 A | * | 8/1928 | Felger .............................. 24/577.1 |
| 1,947,739 A | * | 2/1934 | Reyburn .............................. 24/697.2 X |
| 2,297,277 A | * | 9/1942 | Bambenek .............................. 59/95 |
| 4,167,108 A | * | 9/1979 | Jarman et al. .............................. 24/369 X |
| 4,487,013 A | * | 12/1984 | Worsley et al. .............................. 59/84 |

FOREIGN PATENT DOCUMENTS

| EP | 0774086 | 1/1999 |
|---|---|---|
| WO | 9412807 | 6/1994 |

* cited by examiner

*Primary Examiner*—Robert J. Sandy
(74) *Attorney, Agent, or Firm*—Tarolli, Sundheim, Covell & Tummino L.L.P.

(57) ABSTRACT

The present invention relates to a coupling device for chain links (1) which comprise an elongated element (2) and which are provided with two pairs of eyes or loops (3, 4 and 5, 6 repectively). The coupling device (11) comprises a double-hook member (13) and is designed to cooperate, in a coupling position (K), with the eyes (3, 4) in one of the pairs of eyes by engagement from within of said eyes (3, 4). The double-hook member (13) is sized such that it is insetable into the chain link (1) through an interspace (9) between the shanks (7, 8) and connecting parts of the eyes (3, 4 or 5, 6) and then locatable or positionable in said coupling position (K) in the chain link (1).

10 Claims, 6 Drawing Sheets

COUPLING DEVICE

The present invention relates to a coupling device for chain links comprising an elongated element and provided with two pairs of eyes, the eyes in each pair thereof being substantially parallel, said pairs being located in two planes which are turned substantially in 90° relative to each other and the eyes of the two pairs thereof having substantially the same size such that the chain links can be disconnected from each other without using tools therefor or without changing the shape of said chain links.

Chain links of the above type are previously known from the publication EP 0 774 086. Since such chain links are easy to disassemble, they are suitable for use in many different areas, e.g. for fastening or adjusting the trawl on a fishing boat.

An appropriate coupling device for use in connection with said chain links is however lacking, i.e. a coupling device which can be mounted or located on and removed from the chain links as simple and quickly as said chain links themselves can be located or attached to each other or removed or disassembled from each other, without using tools and without changing the shape of the coupling device.

The object of the present invention is to eliminate the abovementioned shortage and thus, provide an appropriate coupling device for the chain links in question. This is arrived at by providing the coupling device substantially with the characterizing features of subsequent claim 1.

Since the coupling device is provided with said characterizing features, it is quickly and easily connectable to the chain links without the risk of loosening therefrom by accident. Furthermore, the coupling device is durable and stable, which is important for being able to provide a chain with advantageous characteristics.

The invention will be further described below with reference to the accompanying drawings, in which FIG. 1 is a perspective view of two chain links and a coupling device according to the invention;

Figure 1:
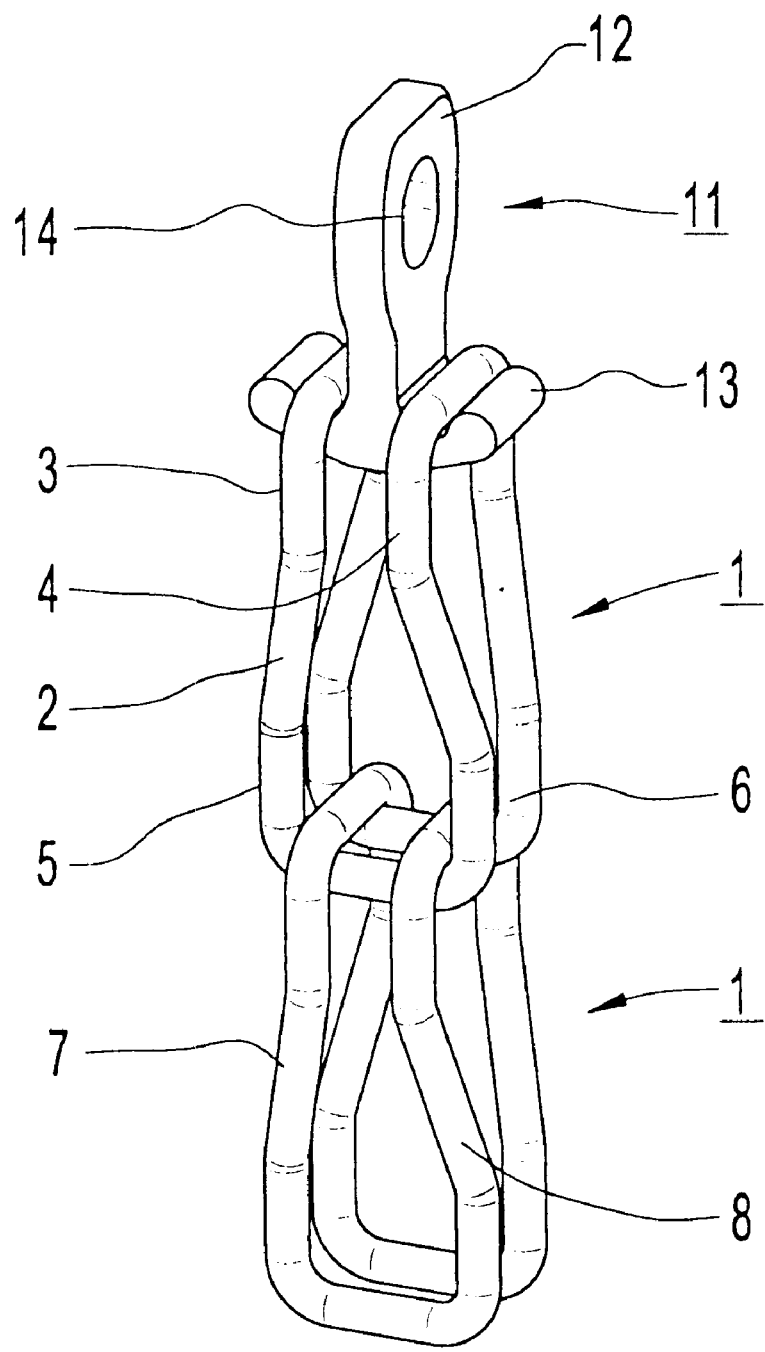

The chain links 1 illustrated in the drawings comprise an endless elongated element 2 and are provided with two pairs of eyes or loops, namely a first pair of eyes 3 and 4 and a second pair of eyes 5 and 6. The eyes in each pair of eyes 3, 4 and 5, 6 respectively, are substantially parallel and the pairs are located in two planes P1, P2 which are turned substantially in 90° relative to each other. Furthermore, the eyes 3, 4 and 5, 6 respectively, of the two pairs have substantially the same size such that the chain links 1 can be disconnected from each other without using tools therefor or without changing the shape of said chain links.

Each chain link 1 has shanks 7 and 8 which connect the pairs of eyes 3, 4 and 5, 6 and which also form part of said pairs of eyes. The chain link 1 has an interspace 9 which connects to an interspace 10. The interspace 10 is found between the eyes 3, 4 and 5, 6 respectively. The interspace 9 is located between the shanks 7, 8 and said parts of the pairs of eyes 3, 4 and 5, 6. The width of the interspace 10 between the eyes 3, 4 and 5, 6 respectively, is B2. The least or smallest width of the interspace 9 is found close to the interspace 10 and is B1. The greatest width of the interspace 9 is found at the eyes 5, 6 and is B4.

Various embodiments of a coupling device 11 are illustrated in the drawings. Common to all embodiments is that the coupling device 11 has a coupling member 12 and a member 13 formed as a double hook and mounted transverse relative to the coupling member 12. The length L1 of the double-hook member 13 is greater than the width B2 of the interspace 10 between the eyes 3, 4 or 5, 6. The width B3 of the double-hook member 13 is greater than the width B2 of the interspace 10 between the shanks 7, 8. The length L1 of the double-hook member 13 may also be greater than the greatest width B4 of the interspace 9 between the shanks 7, 8.

Figure 5:
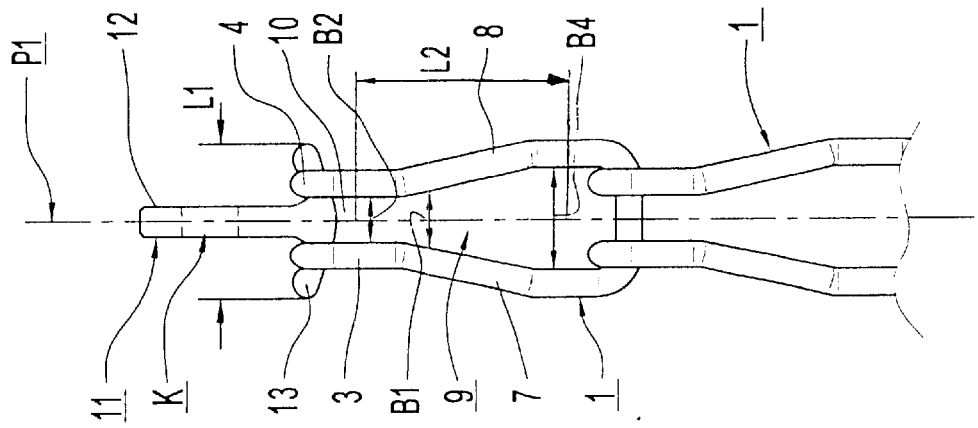
FIG. 5 is a front view of the chain links and illustrates the coupling device in the coupling position as in FIG. 4.

Through this design of the coupling device 11, said coupling device can be placed in a coupling position K wherein the double-hook member 13 is transverse to e.g. the plane P1 (see FIG. 5). Thereby, the double-hook member 13 spans over the interspace 10 between the eyes—the eyes 3, 4 in the illustrated embodiment. The double-hook member 13 engages from within in said coupling position K, the eyes 3, 4 and the coupling member 12 protrudes through the interspace 10 therebetween.

Figure 3:
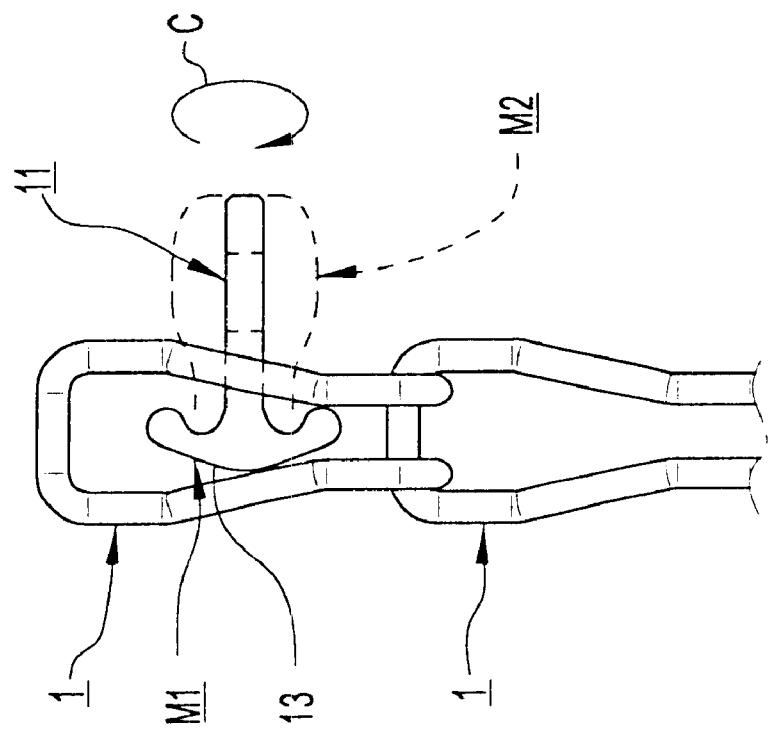
FIG. 3 is a side view of the chain links and illustrates the coupling device in a position when inserted into the chain link and a position after rotation thereof.
Figure 2:
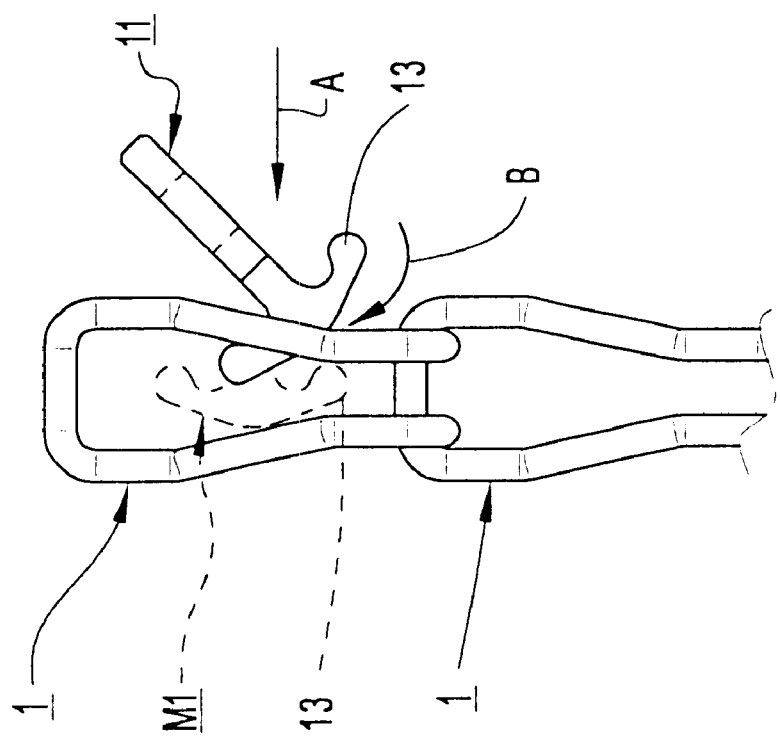
FIG. 2 is a side view of the chain links and shows the coupling device in various positions during insertion thereof into one of said chain links.
Figure 4:
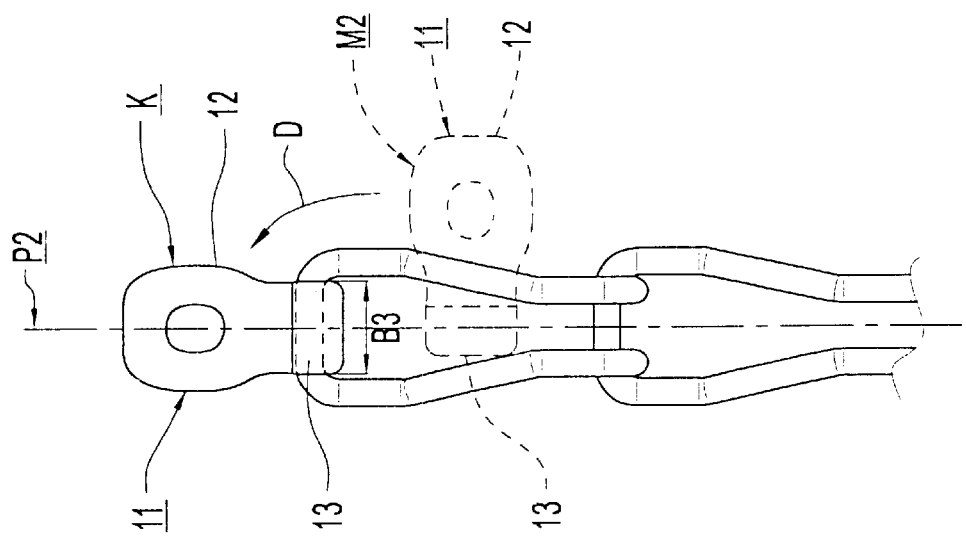
FIG. 4 is a side view of the chain links and shows the coupling device in a pivoted position and a coupling position.

For locating the coupling device 11 in the coupling position K, said coupling device is displaced relative to the chain link 1 as shown in FIGS. 2–4. Thus, the coupling device 11 is placed with the double-hook member 13 oriented in the longitudinal direction in parallel with the longitudinal direction of the interspace 9, whereafter said double-hook member 13 is inserted into the interspace 9 (arrow A, FIG. 2)—eventually with some turning (arrow B, FIG. 2) towards the pair of eyes 3, 4—until it has reached an intermediate position M1 between the pairs of eyes 3, 4 and 5, 6 illustrated with broken lines in FIG. 2 and with solid lines in FIG. 3.

In said intermediate position M1, the coupling device 11 and thus, the double-hook member 13, can be rotated about 90° (arrow C, FIG. 3) until it reaches a second intermediate position M2, illustrated with broken lines in FIG. 4, in which it is directed transverse relative to the longitudinal direction of the interspace 9. From this intermediate position M2, the double-hook member in the chain link 1 can be moved in direction D, FIG. 4, towards the pair of eyes 3, 4 to the coupling position K.

At certain lengths L1 of the double-hook member 13, said member can be moved into the interspace 9 directly to the position M2, i.e. without rotation.

For releasing the coupling device 11 from the chain link 1, the above procedure is reversed.

Since the coupling device 11 for release or withdrawal from the chain link 1 must be moved from the coupling position K to the intermediate position M2 and then rotated in 90° to the intermediate position M1, accidental loosening of the coupling device 11 from the chain link 1 is eliminated, inter alia because the double-hook member 13 due to its length L1 can not be withdrawn or pulled out through the interspace 9 when it is located in the intermediate position M2.

Figure 6:
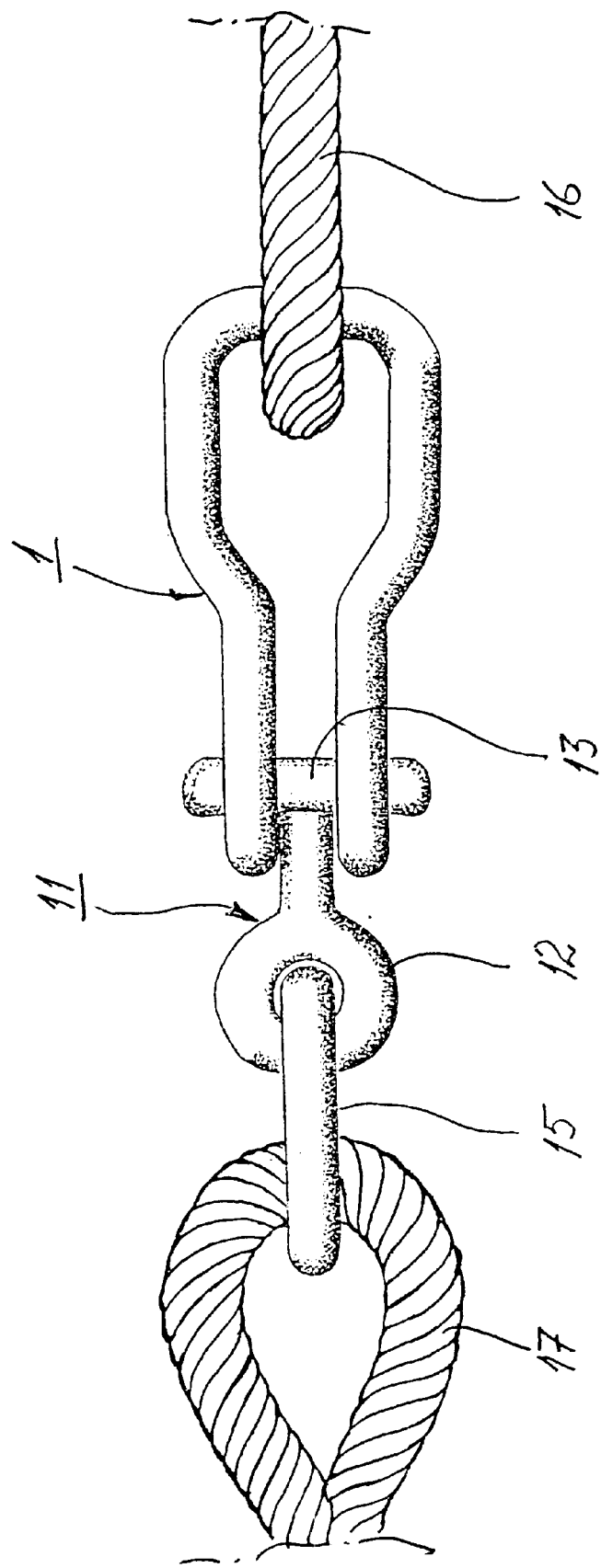
FIGS. 6–8 are side views of chain links having coupling devices of various shapes.

As is apparent from the figures, the coupling member 12 of the coupling device 11 may be designed in various ways and cooperate with different members or parts. At the embodiment of FIG. 1 or FIG. 6, the coupling member 12 has a hole 14. In this hole 14, a suitable coupling means, e.g.

a coupling ring 15, as in FIG. 6, can be provided. In FIG. 6 there is also illustrated a particular manner to use the chain link 1 and the coupling device 11, namely as intermediate pieces between two wires 16, 17.

Figure 7:
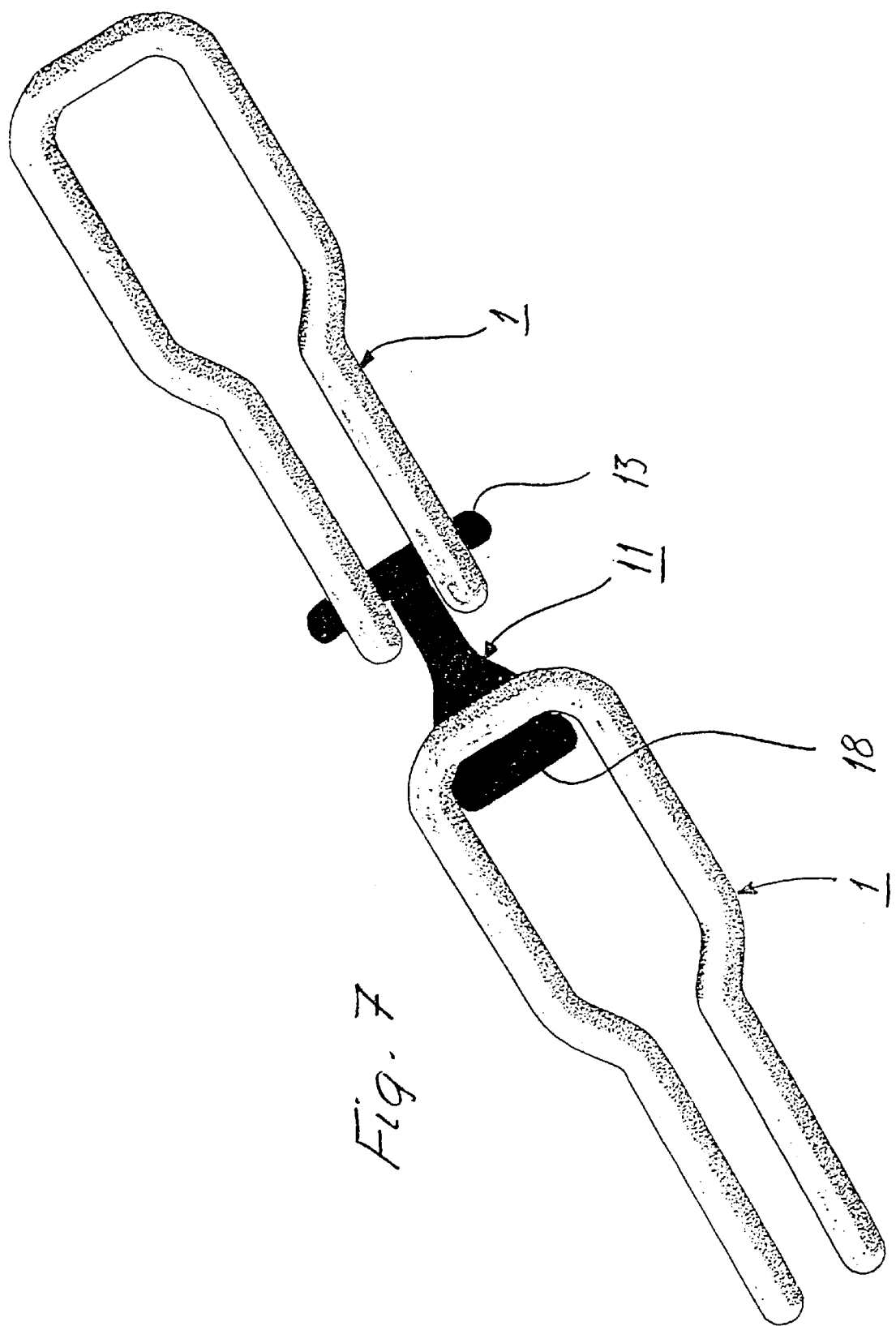

Another alternative embodiment of the coupling device 11 is illustrated in FIG. 7, in which the coupling member 12 also has a member 18 configured as a double hook and preferably twisted in 90° relative to the double-hook member 13. A coupling device 11 of this design can be used e.g. as an intermediate piece between two chain links 1.

Figure 8:
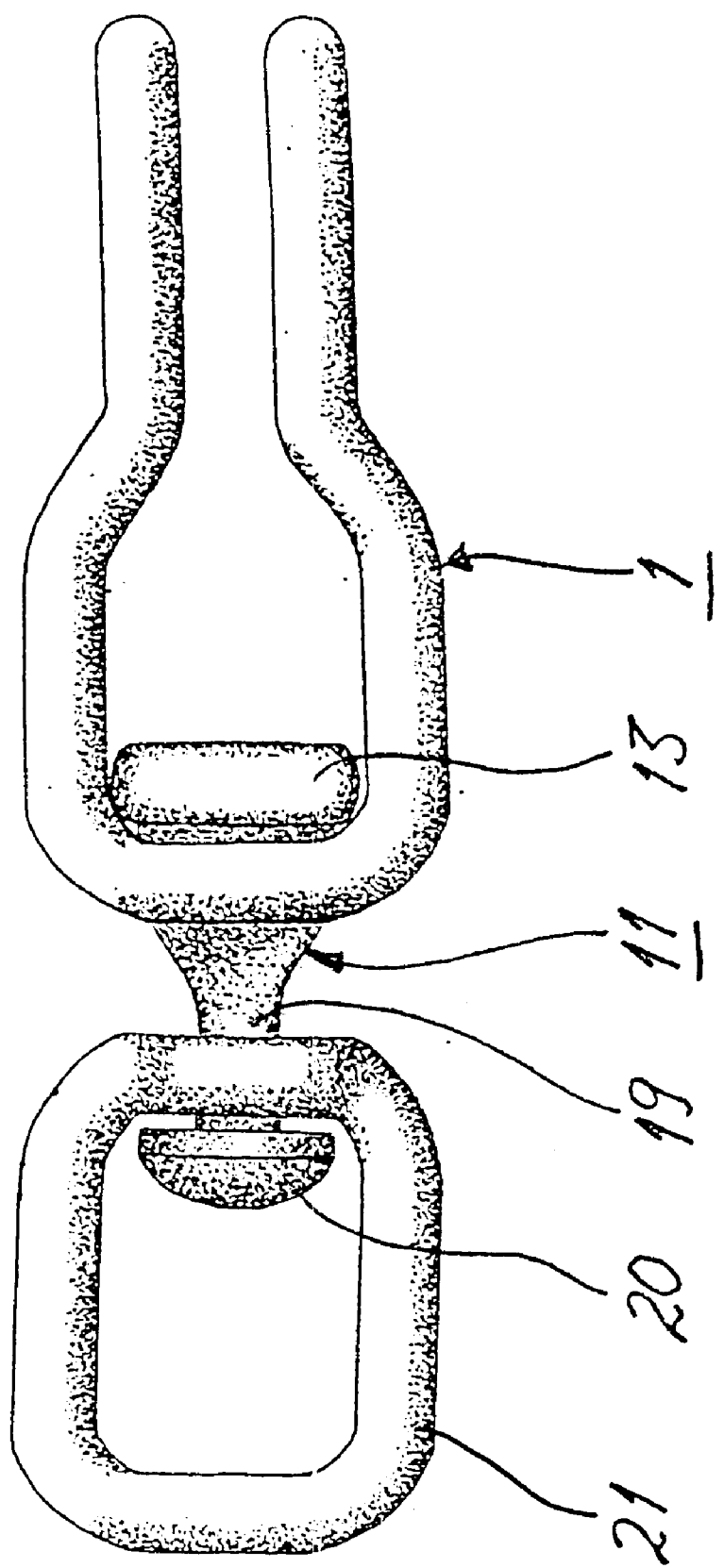

A third alternative embodiment of the coupling device 11 is found in FIG. 8, in which the coupling member is or has a pin 19 with a head 20. On the pin 19 within the head 20 there is rotatably journalled a coupling ring 21 or another suitable coupling means.

The illustrated chain link 1 and the coupling device 11 may consist of metallic material or any other suitable material and chains of chain links 1 and one or more coupling devices 11 can be used for attaching or adjusting trawls on fishing boats or in totally different connections.

With double-hook member 13 is meant a member which can be hooked onto the chain links 1. Its shape may vary in such a way that its shanks are arcuate, straight or designed otherwise.

What is claimed is:

1. Apparatus comprising:
   an elongated element having first and second pairs of eyes located substantially parallel to each other, said first pair of eyes being located on a first plane and said second pair of eyes being located on a second plane 90° relative to said first plane,
   first and second pairs of shanks located between and connected with said first and second pairs of eyes,
   each eye of said first and second pairs of eyes having substantially the same size such that a plurality of elongate elements coupled to each other are disconnected from each other without using additional tools and without changing the shape of said elongate element,
   a coupling device for coupling said elongate element to another structure, said coupling device having an elongate coupling member, said coupling member having a double hook member at one axial end of said coupling member,
   each hook of said double hook member extending perpendicular to said coupling member and in opposite directions relative to each other,
   said double hook member coupling to said first and second pair of eyes,
   said double hook member having a width and a length which is greater than a width of a first space defined between said first and second pair of eyes,
   the width of said double hook member being less than a greatest width of a second space between said shanks,
   said double hook member coupling to said elongated element by passing through said second space and being displaced relative to said elongated element towards said first and second pairs of eyes.

2. The apparatus according to claim 1 wherein said double hook member couples to said elongated element by rotating 90° from a first intermediate position relative to said elongated element to a second intermediate position.

3. The apparatus according to claim 1 wherein the length of said coupling member of said double hook member is larger than the greatest width of said second space.

4. The apparatus according to claim 3 wherein the length of said double hook member prevents said double hook member from decoupling from said elongated element after reaching said second intermediate position.

5. The apparatus according to claim 1 wherein said double hook member during insertion through said second space into said intermediate position is pivotable within said second space in a direction towards one of said first and second pairs of eyes.

6. The apparatus according to claim 1 wherein said coupling member includes at least one hole located at a second axial end for a coupling to said another structure.

7. The apparatus according to claim 1 wherein said coupling device includes a second double hook member at a second axial end, said second double hook member having two hooks, each hook of said second double hook member extending perpendicular to said coupling member and in opposite directions relative to each other, said second double hook member being for coupling to another structure.

8. The apparatus according to claim 7 wherein said first and second double hook members extend in directions 90° relative to each other.

9. The apparatus according to claim 1 wherein said coupling device comprises a coupling member in the form of a pin onto which a coupling means is rotatably journalled.

10. The apparatus according to claim 1 wherein said coupling device is for coupling links of a chain to said another structure for attaching, fastening and adjusting trawls on fishing boats.

* * * * *